United States Patent
Sandoval et al.

(10) Patent No.: US 8,078,120 B2
(45) Date of Patent: Dec. 13, 2011

(54) CITIZENS BAND RADIO WITH WIRELESS CELLULAR TELEPHONE CONNECTIVITY

(75) Inventors: Ramon Sandoval, Chicago, IL (US); Anthony Alfred Mirabelli, Arlington Heights, IL (US); Robert Edward Mudra, Glenview, IL (US)

(73) Assignee: Cobra Electronics Corporation, Chicago, IL (US)

( * ) Notice: Subject to any disclaimer, the term of this patent is extended or adjusted under 35 U.S.C. 154(b) by 531 days.

(21) Appl. No.: 12/368,018

(22) Filed: Feb. 9, 2009

(65) Prior Publication Data

US 2009/0203319 A1    Aug. 13, 2009

Related U.S. Application Data

(60) Provisional application No. 61/027,764, filed on Feb. 11, 2008.

(51) Int. Cl.
*H04B 1/38* (2006.01)
(52) U.S. Cl. ............ 455/90.2; 455/41.2; 455/41.3; 455/575.9
(58) Field of Classification Search ............. 455/41.3, 455/90.2, 575.9
See application file for complete search history.

(56) References Cited

U.S. PATENT DOCUMENTS

| | | |
|---|---|---|
| 5,163,158 A | 11/1992 | Tendler et al. |
| 7,102,568 B1 | 9/2006 | Newman et al. |
| 7,200,358 B1 | 4/2007 | Newman et al. |
| 7,233,795 B1 | 6/2007 | Ryden |
| D598,001 S | 8/2009 | Peng |
| 2003/0083075 A1* | 5/2003 | Miyazaki et al. ............. 455/456 |
| 2004/0048598 A1 | 3/2004 | Gagnon |
| 2005/0020236 A1 | 1/2005 | Mauney et al. |
| 2005/0277445 A1 | 12/2005 | Bae |
| 2006/0058002 A1 | 3/2006 | Bachelder |
| 2006/0116073 A1 | 6/2006 | Richenstein et al. |
| 2007/0242834 A1 | 10/2007 | Coutinho et al. |
| 2009/0029743 A9 | 1/2009 | Lair et al. |
| 2010/0311476 A1* | 12/2010 | Boudreau et al. .......... 455/575.1 |

FOREIGN PATENT DOCUMENTS

| | | |
|---|---|---|
| WO | WO 2009/102663 A1 | 8/2009 |
| WO | WO 2009/102676 A1 | 8/2009 |

OTHER PUBLICATIONS

Ranger Professional PPR-RBT1, photo of product package, Aug. 25, 2009, 1 page.

(Continued)

*Primary Examiner* — Lincoln Donovan
*Assistant Examiner* — John Poos
(74) *Attorney, Agent, or Firm* — Hitchcock Evert LLP

(57) ABSTRACT

A wireless communication device for use in connection with a cellular telephone is disclosed and a transceiver radio such as a citizens band radio. The wireless communication device of the present invention provides enhanced audio broadcasting capabilities for an operator of the device by providing a larger, more powerful speaker than that typically found in a cellular telephone. Thus, the apparatus of the present invention improves cellular telephone usage in a noisy environment such as the cab of a tractor trailer or other vehicle. In another embodiment, the wireless communication device of the present invention is connectable to multiple external devices and is capable of operating the external devices and providing access to a cellular telephone network for such external devices.

101 Claims, 3 Drawing Sheets

OTHER PUBLICATIONS

PCT International Search Report mailed on Apr. 7, 2009 for PCT/US2009/033568.
http://yaesu.com/indexVS.cfm?cmd=DisplayProducts&ProdCatID=106&encProdID=AF7E..., May 1, 2009, 3 pages.
Great New Features to Support Outdoor Motor Sports Activities, 2 m/70 cm Band FM Dual Band Transceiver FTM-10R/E (European Version), Japan, 4 pages.
VX-8R/E, 50/144/ (222)*1/430 MHz FM 5 W/AM 1 W (50 MHz) Triple Band Handheld, Japan, 4 pages.
http://www.yaesu.com/indexVS.cfm?cmd=DisplayProducts&ProdCatID=111&encProdID=..., May 1, 2009, 2 pages.
PCT International Search Report, mailed Mar. 27, 2009 for PCT/US09/33610.

* cited by examiner

CITIZENS BAND RADIO WITH WIRELESS CELLULAR TELEPHONE CONNECTIVITY

CROSS-REFERENCE TO RELATED APPLICATION

This application claims the benefit of priority from U.S. Provisional Application No. 61/027,764 filed on Feb. 11, 2008.

FIELD OF THE INVENTION

The present invention relates generally to a citizens band radio having wireless connectivity, such as by Bluetooth technology or other wireless standard, to a cellular telephone or other device that connects to the cellular network or a similar network. The operator of the citizens band radio is therefore able to place and receive cellular telephone calls while taking advantage of the microphone and more powerful speaker units associated with the citizens band radio.

BACKGROUND

Citizens band radios, or "CBs," have long been used for communication, primarily between truck drivers, but also by hobbyists and the like. Traditionally, the citizens band radio may have been the long-haul trucker's primary mode of communication. However, with the advent and widespread use of cellular telephones and other devices on the cellular telephone network, much of a truck driver's communication can now be done via a cellular telephone. Yet many truck drivers may still desire a citizens band radio for communication from truck to truck. For this reason, many drivers may still equip their trucks with a citizens band radio and carry a cellular telephone with them for communication with known parties or other parties that are outside the range of the CB radio.

Use of a cellular telephone communication while driving, however, has several known disadvantages. For example, the mere act of locating, retrieving, and answering a cellular telephone from, for example, a pocket, may be distracting to a driver. Furthermore, and of particular importance to drivers of tractor trailers, may be noise present in the cab of a truck which may overwhelm the capabilities of a cellular telephone. Noise associated with the truck's engine may make communication difficult. First, the truck operator may have difficulty hearing as the noise of the truck may drown out conversation. Second, the person speaking to the truck operator may be unable to hear the operator's voice, as a cellular telephone may pick up and transmit the ambient noise from the interior of the truck. Similarly, the noisy environment of the truck may make it difficult to even hear the ring of a cellular telephone.

Therefore, it is desirable to provide a communication system that has the advantages of cellular telephone communication, while eliminating the disadvantages associated with using a cellular telephone in a noisy environment such as a tractor trailer. Furthermore, it is desirable to provide a communication device which may be integrated into a communication device already adopted by many truck drivers and which is therefore already familiar to most drivers and may therefore be more easily used while driving.

SUMMARY OF THE INVENTION

It is an object of the present invention to provide a citizens band radio that is wirelessly connectable to a cellular telephone, and thereby enables an operator of the citizens band radio to carry on a conversation over the cellular telephone network while utilizing the microphone and speaker(s) integrated with the citizens band radio.

It is another object of the present invention to provide a citizens band radio which is wirelessly connectable to a cellular telephone, and which provides a user interface which is familiar to users of citizens band radios.

It is yet another object of the present invention to provide a citizens band radio that is wirelessly connectable to a cellular telephone and which may provide audio broadcasting capabilities which are superior to the cellular telephone.

It is yet another object of the present invention to provide a citizens band radio which is operable from an on-board power source.

It is yet another object of the present invention to provide a wireless Bluetooth® device which is operable from an on-board power source and is wirelessly connected to a citizens band radio.

It is yet another object of the present invention to provide a citizens band radio which has an easy to use interface and which uses an existing cellular telephone to make and receive calls.

It is yet another object of the present invention to provide a citizens band radio which can be paired with cellular telephones and will select pairing based on a priority.

It is yet another object of the present invention to provide a citizens band radio that is switchable between a cellular telephone mode and a citizens band radio mode.

It is yet another object of the present invention to provide a citizens band radio which is wirelessly connectable to a cellular telephone and which may provide noise canceling attributes for both cellular telephone communication and citizens band radio communication.

It is yet another object of the present invention to provide a citizens band radio that is wirelessly connectable to a cellular telephone and which may improve communication between its operator and another person, whether over a cellular network or over citizens band radio frequencies through use of an adjustable gain function.

It is yet another object of the present invention to provide a citizens band radio that is wirelessly connectable to a cellular telephone and which may integrate with additional output units, such as external speakers.

It is yet another object of the present invention to provide a citizens band radio that is wirelessly connectable to a cellular telephone and, by utilizing the Bluetooth® connection, may redial a last telephone number dialed, answer calls, enable and disable voice activation of a voice enabled cellular telephone, and initiate and terminate the wireless connectivity, or other functions supported by the wireless standard used by the device.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description. Furthermore, the figures shown are specific to only one particular embodiment of the communication device described. However, the present invention is applicable to any number of communication devices, and the particular circuitry and embodiments illustrated should not be taken as a limitation of the present invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
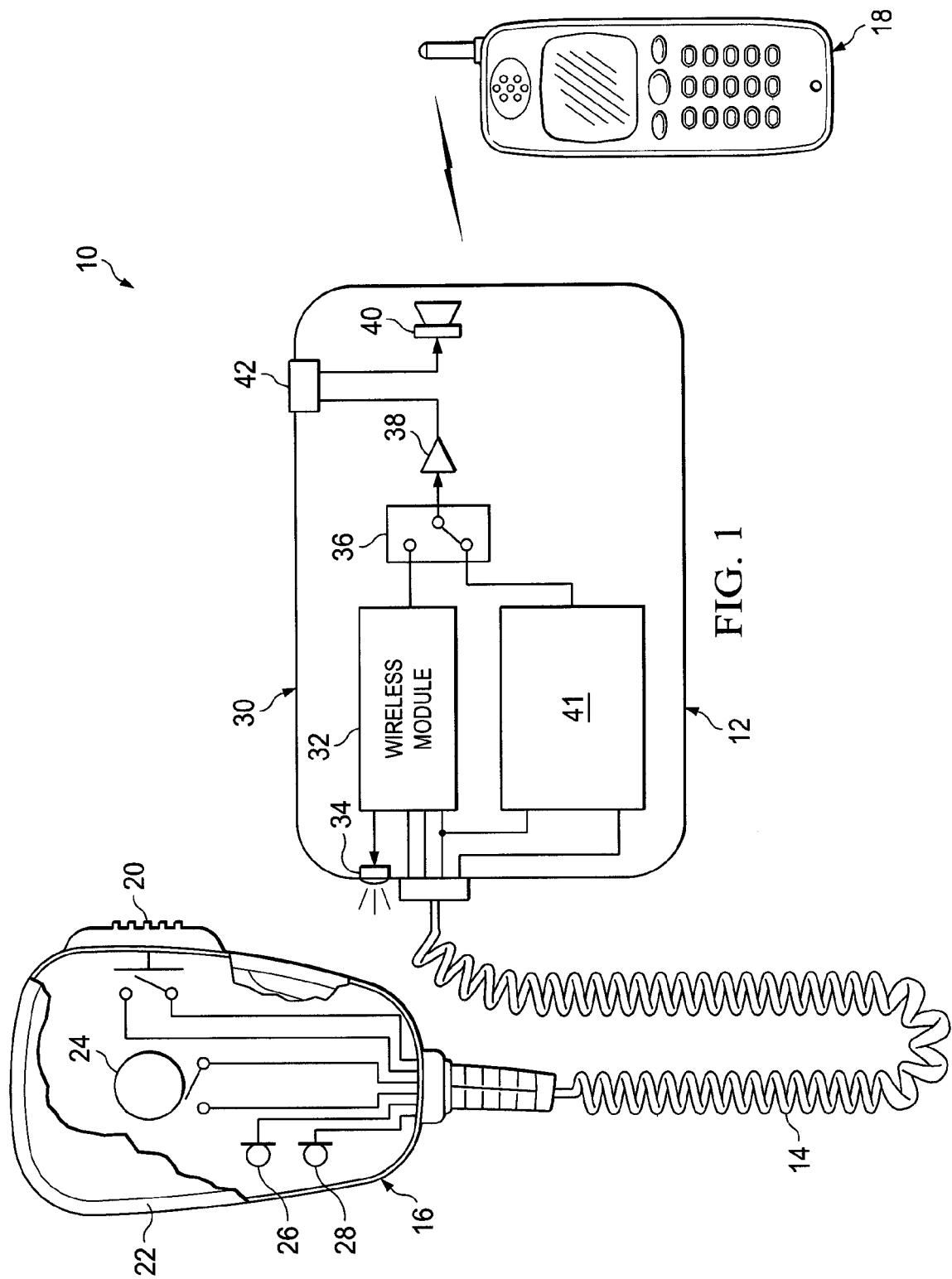
FIG. 1 is a block diagram showing the basic layout of the citizens band radio of the present invention.

With reference to FIG. 1, a citizens band radio 10 with wireless connectivity with a cellular telephone is shown according to the principles of the present invention. However, it will be understood that the scope of the present invention should not be limited to this particular wiring architecture.

Citizens band radio 10 is comprised of base 12, typically a vehicle mounted transceiver unit and, in the embodiment shown, cord 14, and handset 16. Cellular telephone 18, while not forming a part of citizens band radio 10, is an integral part of the communication system, and is in wireless communication with citizens band radio 10. As one having skill in the art will recognize a smart phone or any other device which connects to the cellular telephone network or a similar wireless network may be used along with or in place of cellular telephone 18. Accordingly, the term cellular telephone includes all devices which connect to the cellular telephone network or a similar wireless network such as a WiFi, Zigbee, or satellite network. As shown in FIG. 1, switch 20 is interposed within handset case 22 such that an operator may depress or otherwise activate switch 20 without the need for opening handset case 22.

The circuitry comprising handset 16 as shown in the depicted embodiment of the present invention is simplified for ease of presentation and includes wireless activation switch 24, and, in the embodiment shown, separate microphones 26 and 28 for wireless communication and citizens band radio communication respectively. It should be understood that alternate embodiments which may employ a single microphone for both wireless and citizens band radio communication, and the attendant switching circuitry would not deviate from the scope of the invention. Electrical signals generated in handset 16 are transmitted to base 12 via cord 14. As one having skill in the art will recognize, the operative association provided by cord 14 may be achieved through other means including but not limited to a wireless connection between the handset 16 and base 14, and such other means would remain within the scope and spirit of the present invention.

Base 12 is comprised of base case 30, wireless module 32, wireless indicator 34, audio output switch 36, amplifier 38, speaker 40, and in the embodiment shown, an external output jack 42. Wireless module 32 may comprise a Bluetooth® module, a ZigBee® module, Infra Red module, or an 802.11, Wi-Fi, or WiFimax module of various types known in the art, although use of alternative wireless standards would not deviate from the scope of the invention. In a preferred embodiment, wireless module 32 is a Bluetooth® module. Wireless module 32 is operatively connected to wireless indicator 34, audio output switch 36, and receives input from wireless activation switch 24 and wireless communication microphone 26.

Audio output switch 36, which selects between audio from the citizens band radio or audio associated with the cellular telephone, is in turn connected to amplifier 38. Amplifier 38 may be connected to speaker 40, with, in certain embodiments, external output jack 42 interposed therebetween.

In citizens band mode, the citizens band radio of the present invention is operated in much the same way as is known to operate a citizens band radio (the citizens band radio components are represented by box 41). That is, when the operator wishes to speak using the citizens band radio functionality, he or she presses switch 20 to enable talk mode. While in citizens band radio mode, it is necessary to depress switch 20 prior to speaking as, as is known in the citizens band radio art, conversations are in half-duplex mode (sometimes referred to as simplex mode) meaning that audio signals are transmitted in only one direction at a time. Once switch 20 has been depressed, the operator may begin speaking into citizens band radio microphone 28. The operator's auditory input is converted to an electrical signal by citizens band radio microphone 28 and then broadcast over the known citizens band 27 MHz frequency.

However, the citizens band radio of the present invention adds the functionality of allowing an operator to carry on a conversation via cellular telephone using elements of the hardware associated with the citizens band radio. First, cellular telephone 18 must be one of a known type of cellular telephones which incorporate wireless connectivity with similarly compliant devices. A common standard for this type of communication, although not a limitation of the present invention, is Bluetooth® and is well known in the art. When cellular telephone 18 receives a call, a signal is sent by the short range wireless transceiver within cellular telephone 18 and is detected by wireless module 32. Wireless module 32 and cellular telephone 18 may then begin communication. It should be understood that in the example just given, cellular telephone 18 will have been paired with citizens band radio 10 at some point in the past. Pairing of cellular telephones with wireless devices over wireless connections utilizing, for example, the Bluetooth® standard is well known in the art. In addition, wireless module 32 may be paired with more than one cellular telephone, and is operable to select priority pairing. Priority pairing may be user defined, selected by order of pairing, current activity with the wireless module, or another form of priority, and all remain within the scope and spirit of the present invention.

Once cellular telephone 18 and citizens band radio 10 have been paired, if the operator wishes to use his or her cellular telephone in connection with the citizens band radio of the present invention, several modes of operation are possible. In call receiving mode, when cellular telephone 18 receives a call, a signal is sent to wireless module 32. Wireless module 32 then initiates an electrical signal to amplifier 38, where the electrical signal is amplified and passed on to speaker 40, where the electrical signal is converted to an auditory signal such that it may be heard by the operator. In this case, the auditory signal may be ring tone alerting an operator that a telephone call is incoming. To answer the call, an operator of citizens band radio 10 would activate wireless activation switch 24, causing citizens band radio 10 to enter cellular telephone mode. In this mode, the citizens band radio microphone 28 is disabled and any audio associated with citizens band mode is muted. Furthermore, switch 20 is disabled as in cellular telephone mode communication is full duplex, meaning that audio signals are simultaneously broadcast from both ends of the conversation. It should be understood that alternate embodiments of the present invention may employ switch 20 during cellular telephone communication as well.

That is, in certain embodiments, while in cellular mode communication may be changed from duplex mode communication into half-duplex, or simplex communication. Although half-duplex communication is not the preferred embodiment of the present invention, such an embodiment would not deviate from the scope of the invention. As one skilled in the art will recognize, switch 20 and wireless activation switch 24 may be any type of sensor, including but not limited to a voice activation sensor, inertial sensor, variable sensor, touch sensor, or button including the push-to-talk button commonly found on VHF or citizens band radios. Finally, wireless indicator 34 may indicate that a call is in progress. In a preferred embodiment, wireless indicator 34 is a light, preferably a blue light emitting diode, and would be constantly lit to indicate a call in progress. However, other types of wireless indicators and/or alternate indicators of in-progress calls would not deviate from the scope of the invention. In addition, embodiments that include other types of indicators, use indicators to indicate other information (e.g. that communication via the citizens band radio is in progress), and/or do not include a wireless indicator are still within the scope of the invention.

The operator would then speak normally into handset 16, his or her voice being picked up by wireless communication microphone 26, modulated and broadcast wirelessly by wireless module 32 to cellular telephone 18. Similarly, the operator may listen to the conversation through speaker 40. Because speaker 40 is physically larger than the speaker associated with cellular telephone 18, and because both speaker 40 and amplifier 38 are powered by a more robust power source (not shown, but typically a 12 volt power source associated with the vehicle in which citizens band radio 10 is mounted) associated with the citizens band radio 10, speaker 40 will generally be capable of broadcasting the audio signal at a much greater volume than would the speaker associated with cellular telephone 18.

To initiate a telephone call over cellular telephone 18 using citizens band radio 10, an operator would begin by initiating a call as per the requirements of the cellular telephone 18 paired with citizens band radio 10. While the call initiation operations are ongoing, any tones generated by cellular telephone 18 may be wirelessly transmitted to citizens band radio 10 and broadcast over speaker 40. Once the call has been connected, conversation may ensue as previously described. Furthermore, wireless indicator 34 may illuminate as previously described. To terminate the call, the operator may activate wireless activation switch 24. Doing so will return citizens band radio 10 to citizens band radio mode. As in call receiving mode, when in call initiation mode, the operator of citizens band radio 10 will have the benefit of the larger speaker 40 associated with citizens band radio 10. Furthermore, in both call receiving and call initiation modes, the operator will be utilizing a microphone which, unlike the microphone associated with cellular telephone 18, may be gain adjusted, particularly when the unit is used in a tractor trailer, to minimize the ambient noise picked up by wireless communication microphone 26. In addition, in a preferred embodiment, noise cancelling circuitry or technology, either acoustic or electronic, may be incorporated in citizens band radio 10. This technology is well known to those skilled in the art, and is not generally available in cellular telephones. Finally, in extremely noisy environments, an operator may place an external speaker in operative connection with external output jack 42. The external speaker may be of any type compatible with citizens band radio 10, and may further amplify the audio output far beyond what may be possible using cellular telephone 18 alone.

Other functions may be accomplished through use of wireless activation switch 24 and are generally limited only by the range of functions supported by the relevant wireless standard. For example, wireless activation switch 24 may be used to initiate alternate functions in cellular telephone 18 such as voice dialing, last number re-dialing, and enabling and disabling the wireless connectivity between cellular telephone 18 and citizens band radio 10. Those skilled in the art will recognize that the range of functions available is limited only by the functionality of cellular telephone 18 and that the ability to incorporate or activate certain of these functions is not a limitation of the present invention. The range of functions of cellular telephone 18 may include text messaging, e-mail, internet, voicemail, etc.

Figure 2:
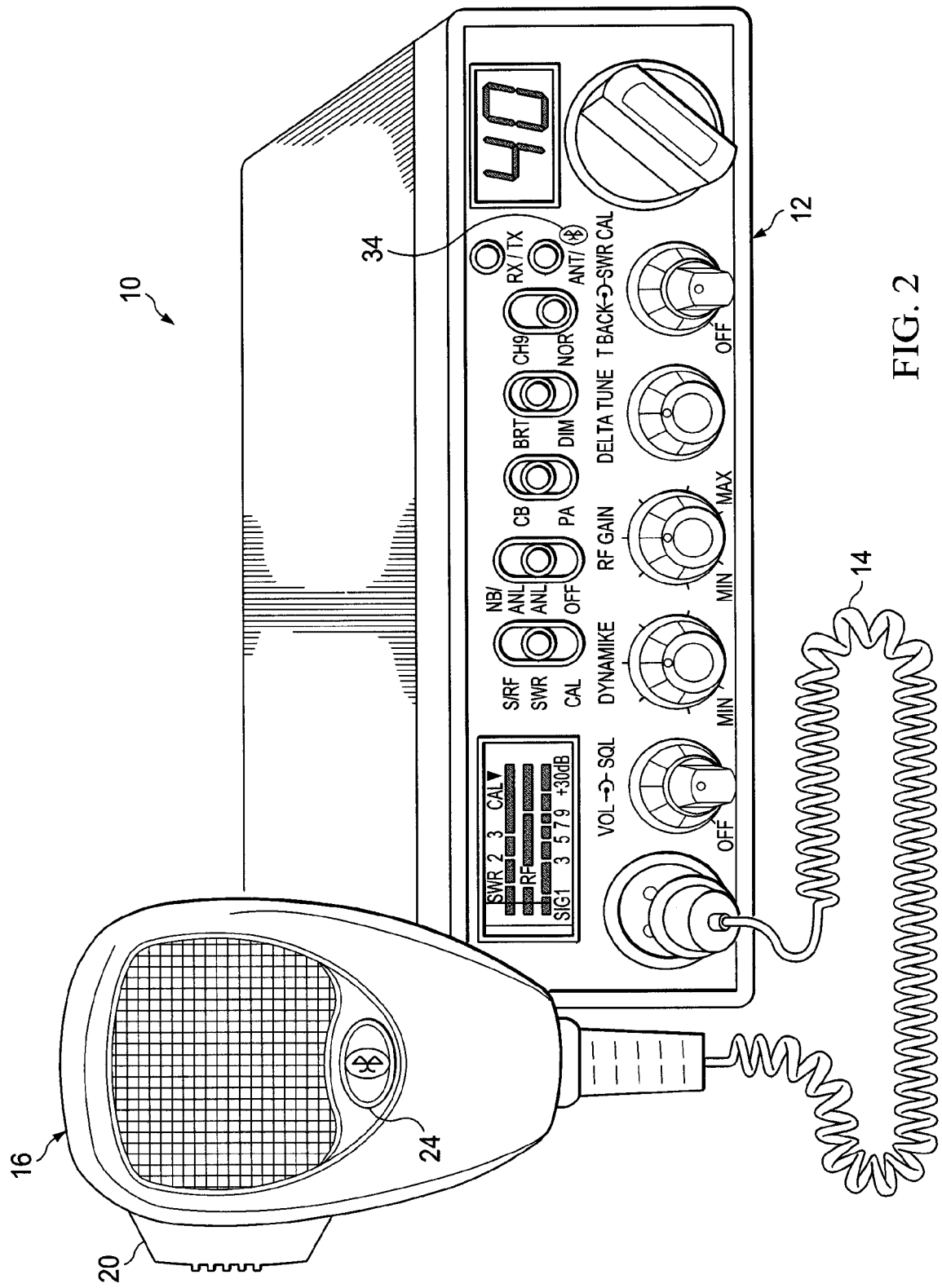
FIG. 2 is a view of the front of one embodiment of the citizens band radio of the present invention.

Turning to FIG. 2, various features of citizens band radio 10 discussed in relation to FIG. 1 are again depicted. In particular, base 12, cord 14, handset 16, switch 20 wireless activation switch 24, and wireless indicator 34 are all shown. It should be understood that the particular arrangement of controls shown on the face of citizens band radio 10 are for illustration purposes, and should not be taken as a limitation of the present invention.

Figure 3:
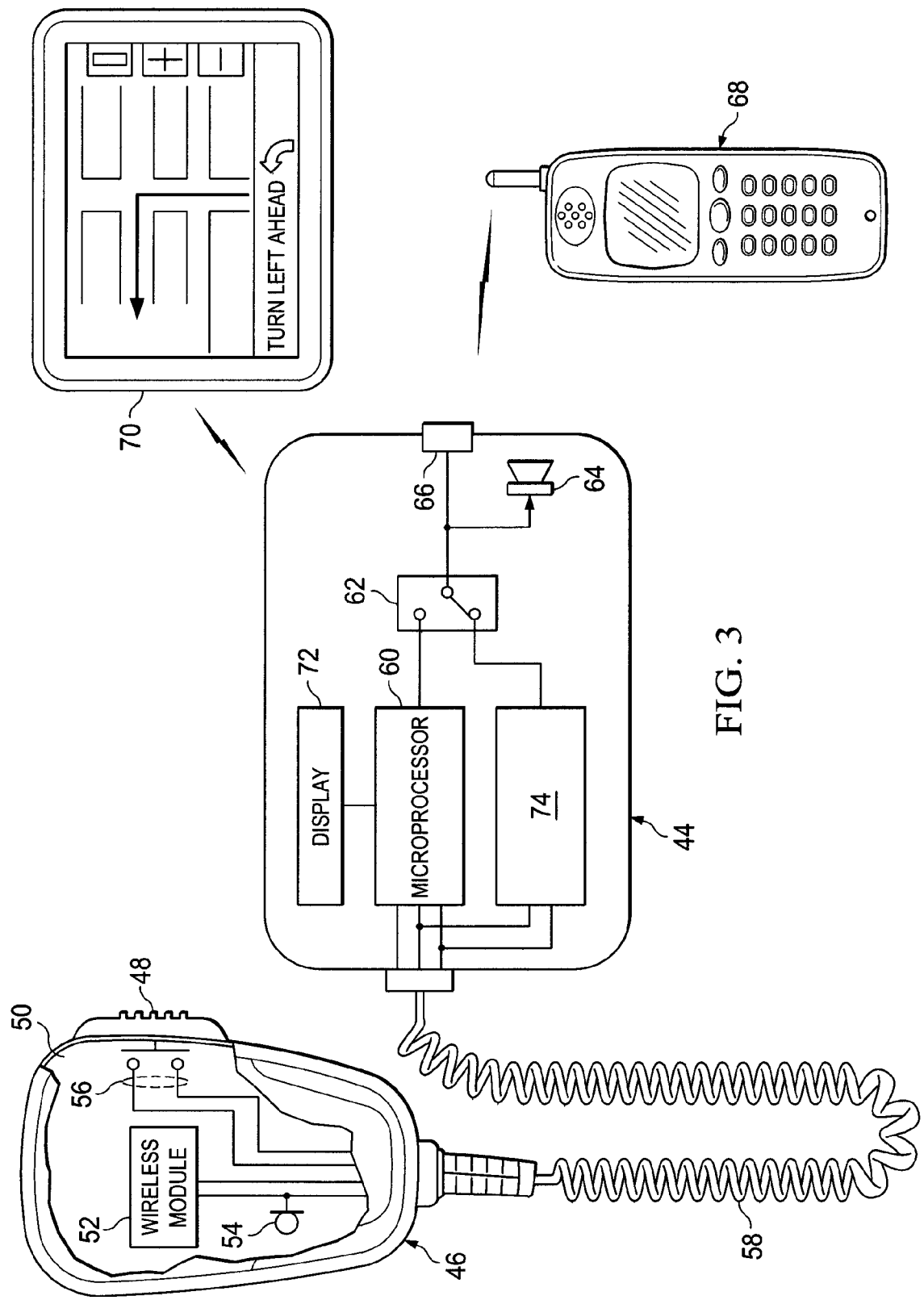
FIG. 3 is a block diagram showing an alternate embodiment of the citizens band radio of the present invention in wireless communication with more than one external device.

FIG. 3 depicts another embodiment of the present invention with handset 46 and base 44 operatively associated by cord 58. As discussed regarding FIG. 1, other operative associations than cord 58 may be employed and remain within the scope and spirit of the present invention. Case 50 of handset 46 encloses microphone 54, wireless module 52, and leads 56 all of which are operatively associated with cord 58. Handset 46 also includes an interface, shown as switch 48 in FIG. 3. As one having skill in the art will recognize, the interface may include one or more switches, and the switch (or switches) may be any type of sensor or combination of sensors, including but not limited to a voice activated sensor, inertial sensor, variable sensor, touch sensor, or button including the push-to-talk button commonly found on VHF or citizens band radios.

In this embodiment, when switch 48 is activated, leads 56 are connected sending an electrical signal vial cord 58 to microprocessor 60 and the radio transceiver components (shown as box 74). When switch 58 is deactivated, leads 56 are disconnected stopping the transmission of electrical signals to microprocessor 60 and the radio transceiver components (shown as box 74). Microphone 54 is connected to wireless module 52 and, via cord 58, to microprocessor 60 and the radio transceiver components (shown as box 74), and is operable to function as the microphone for the transceiver mode and the external device mode. In a preferred embodiment, the radio transceiver components operate on the citizens band radio frequencies, however, as one skilled in the art will recognize the radio transceiver is not limited to operation on the citizens band radio frequencies and may operate on any frequency and remain within the scope and spirit of the present invention, including business band, aviation, VHF, marine bands, and public safety frequencies. The radio transceiver may also operate with the Multi Use Radio Service and/or the General Mobile Radio Service.

Wireless module 52 may comprise a Bluetooth® module, a ZigBee® module, Infra Red module, or an 802.11, Wi-Fi, or WiFimax module of various types known in the art, although use of alternative wireless standards would not deviate from the scope of the invention. Wireless module 52 is compatible with and operatively connectable with external devices 68 and 70.

Base 44 includes microprocessor 60, output switch 62, speaker 64, output jack 66, and display 72. Microprocessor 60 is in operative association with leads 56, microphone 54, and wireless module 52 of handset 46 via cord 58. Microprocessor 60 is also in operative connection with display 72 and output switch 62. Output switch 62 is operable to select between audio output from wireless module 52 and the radio transceiver components (shown as box 74), and is in operative connection with speaker 64 and output jack 66.

FIG. 3 also depicts the communication device of the present invention operatively associated with external devices 68 and 70 via wireless module 52 found in handset 46 of the communication device. In FIG. 3, external device 68 is depicted as a cellular telephone and external device 70 is depicted as a navigation device (hereinafter "cellular telephone 68" and "navigation device 70" respectively). As one skilled in the art will recognize, various types and numbers of external devices may be operatively associated with the communication device and remain within the scope and spirit of the invention, including but not limited to navigation units, weather units, entertainment devices, computers, radar detectors, etc. Similar to the invention as described in FIG. 1, in this embodiment, the communication device can wirelessly connect to cellular telephone 68 through wireless module 52 to facilitate communication via cellular telephone 68 and is operable to control the functions of cellular telephone 68 via the interface depicted as switch 48.

In addition, in this embodiment the communication device may act as a wireless hub by providing access for various external devices through the cellular telephone network by operatively connecting to a paired cellular telephone 68. As one skilled in the art will recognize, cellular telephone 68 could also be a smart phone or other device which communicates on the cellular telephone network or other similar network and remain within the scope and spirit of the invention. In this embodiment, the communication device connects to the cellular network as described above by connecting to cellular telephone 68 via a wireless connection, such as Bluetooth®, by wireless module 52. Once connected to the cellular network, the communication device can access the Internet or other network and provide access to other operatively connectable devices.

For example, navigation device 70 may be connected wirelessly to wireless module 52 of the communication device. In this embodiment, navigation device 70 would be Bluetooth® compatible to wirelessly connect to wireless module 52. Navigation device 70 could then transmit to and receive information from the Internet by wireless signal to the communication device which is in turn transmitted wirelessly to cellular telephone 68 and to the Internet. The functions of navigation device 70 can be operatively controlled using the communication device interface depicted as switch 48 or may be controlled using the device's own interface.

In addition, navigation device 70 may include at least one voice activation sensor. The communication device receives voice commands into microphone 54 and transmits the commands to the navigation device 70 wirelessly. In this embodiment, the communication device acts as a voice input for navigation device 70 and any other devices in operative connection. Display 72 may be used to indicate what other devices are in operative connection with the communication device and which device is currently in use. In this embodiment, switch 48 may be used to select which device is in use. In other embodiments utilizing an interface with more than one switch, selection of the device may occur through a separate switch. As one skilled in the art will recognize, any number of configurations for selecting devices may be used and all remain within the scope and spirit of the invention.

In a further embodiment, base 12 (or base 44 from FIG. 3) may also include an external microphone jack. The external jack allows an operator to connect an external microphone to the apparatus to use in place of wireless communication microphone 26 (or microphone 54 from FIG. 3). In such use, circuitry within base 12 (or base 44 from FIG. 3) would recognize that an external microphone had been connected, and would therefore disconnect or otherwise bypass wireless communication microphone 26 (or microphone 54 from FIG. 3). Of course, alternate arrangements wherein wireless microphone remained active would not deviate from the scope of the invention. The use of an external microphone in this manner would also permit the operator to operate the apparatus in a hands-free mode.

As one having skill in the art will recognize, other embodiments of the invention may use alternative selective devises instead of audio output switch 36 (or output switch 62 from FIG. 3) in order to select between communication received via the transceiver radio or received via the cellular telephone (or other external device). Such alternative selective devices may be located in various positions within the apparatus or incorporated into other components of the invention. Selective devices may operate to allow only the operation of one form of communication at a time, or the selective device may diminish signals originating from one form of communication and/or increase signals originating from another form of communication. For example, in an alternative embodiment of the invention having separate speakers for communication received via the cellular telephone and communication received via the radio transceiver, the selective device may decrease the radio transceiver's speaker output and increase the speaker output associated with the cellular telephone in order to facilitate communication via the cellular telephone. Notably, decreasing the output signal to nothing is equivalent to muting or turning off the output. The variations of selective devices that have the effect of selecting the form of communication remain within the scope and spirit of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A citizens band radio having wireless cellular telephone connectivity comprising:
    a vehicle mounted transceiver unit;
    a handset comprising at least one microphone and a cellular activation switch; and
    a cord operatively connecting said handset with said vehicle mounted transceiver unit;
    wherein said vehicle mounted transceiver unit comprises: a citizen band radio transceiver;
    a wireless module operable to receive and transmit wireless communications with at least one cellular telephone;
    an output switch in operative connection with an amplifier and speaker and operable to select between at least communication received via citizens band wireless spectrum and communication received via said cellular telephone; and
    an indicator operable to indicate when communication is occurring via said cellular telephone.

2. The citizens band radio of claim 1 wherein said wireless module is a Bluetooth module.

3. The citizens band radio of claim 1 wherein said handset comprises separate microphones for communication via the citizen band wireless spectrum and communication via cellular telephone.

4. The citizens band radio of claim 1 wherein communication via cellular telephone may be made in half-duplex mode.

5. The citizens band radio of claim 1 wherein the cellular telephone is a smart phone.

6. The citizens band radio of claim 1 wherein the cellular telephone is connected to a cellular telephone network.

7. The citizens band radio of claim 1 wherein the cellular telephone is connected to a satellite network.

8. The citizens band radio of claim 1 wherein said citizens band radio is in removable operative connection with an external speaker.

9. The citizens band radio of claim 1 wherein the microphone further comprises an acoustic noise cancelling design.

10. The citizens band radio of claim 1 wherein the microphone further comprises at least one electronic noise cancelling circuit.

11. The citizens band radio of claim 1 wherein said citizens band radio will selectively pair with one of said at least one cellular telephone based on priority.

12. The citizens band radio of claim 1 wherein said wireless module is a wireless module selected from the group consisting of a Bluetooth module, a ZigBee module, an in infra red module, a module adhering to the 802.11 standard of the Institute of Electrical and Electronics Engineers, a Wi-Fi module, and a WiFimax module.

13. The citizens band radio of claim 1 wherein said speaker is operable to broadcast sound at a greater volume than that achieved by said cellular telephone.

14. The citizens band radio of claim 1 further comprising an external output jack connectable to at least one external speaker.

15. The citizens band radio of claim 1 wherein said citizens band radio is operable to receive telephone calls via said cellular telephone.

16. The citizens band radio of claim 1 wherein said citizens band radio is operable to place telephone calls via said cellular telephone.

17. The citizens band radio of claim 1 further comprising at least one interface.

18. The citizens band radio of claim 17 wherein said interface is operatively associated with said radio transceiver when said output switch operatively selects communication via the citizens band wireless spectrum and wherein said interface comprises controls for at least one function of said radio transceiver.

19. The citizens band radio of claim 17 wherein said interface is operatively associated with said at least one cellular telephone when said output switch operatively selects communication via said cellular telephone and wherein said interface comprises controls for at least one function of said cellular telephone.

20. The citizens band radio of claim 1 further comprising at least one external device.

21. The citizens band radio of claim 20 wherein said wireless module is operable to communicate with said at least one external device, wherein said citizens band radio can send and receive communications and/or data from said at least one external device and send and receive said communications and/or data to said at least one cellular telephone.

22. The citizens band radio of claim 1 wherein said wireless module is operable to wirelessly communicate with at least one voice activated device.

23. The citizens band radio of claim 1, further comprising an external microphone jack.

24. A communication device having wireless cellular telephone connectivity comprising:
a vehicle mounted transceiver unit; and
a handset in operable association with said vehicle mounted transceiver unit, wherein said handset comprises at least one microphone, an interface, and a wireless module operable to receive and transmit wireless communications with at least one cellular telephone;
wherein said vehicle mounted transceiver unit comprises:
a radio transceiver having a wireless spectrum;
at least one speaker; and
a selective device in operative association with said wireless module and said radio transceiver, and operable to select between at least communication via the radio transceiver's wireless spectrum and communication via said cellular telephone.

25. The communication device of claim 24 wherein said radio transceiver operates on the citizens band radio frequencies.

26. The communication device of claim 24 wherein said radio transceiver operates on the business band radio frequencies.

27. The communication device of claim 24 wherein the operable association between said vehicle mounted transceiver unit and said handset comprises a cord.

28. The communication device of claim 24 wherein the operable association between said vehicle mounted transceiver unit and said handset comprises a wireless connection.

29. The communication device of claim 24 wherein said vehicle mounted transceiver unit further comprises an amplifier in operative association with said speaker.

30. The communication device of claim 24 wherein said vehicle mounted transceiver unit further comprises at least one indicator operable to indicate the active mode of communication.

31. The communication device of claim 24 wherein said handset comprises separate microphones for communication via the citizens band wireless spectrum and communication via said cellular telephone.

32. The communication device of claim 24 wherein communication via said cellular telephone may be made in half-duplex mode.

33. The communication device of claim 24 wherein said cellular telephone is a smart phone.

34. The communication device of claim 24 wherein said cellular telephone is connected to the cellular telephone wireless network.

35. The communication device of claim 24 wherein the cellular telephone is connected to a satellite network.

36. The communication device of claim 24 further comprises an acoustic noise cancelling design.

37. The communication device of claim 24 further comprises at least one electronic noise cancelling circuit.

38. The communication device of claim 24 wherein said communication device will selectively pair with one of said at least one cellular telephone based on priority.

39. The communication device of claim 24 wherein said wireless module is a wireless module selected from the group consisting of a Bluetooth module, a ZigBee module, an in infra red module, a module adhering to the 802.11 standard of the Institute of Electrical and Electronics Engineers, a Wi-Fi module, and a WiFimax module.

40. The communication device of claim 24 wherein said wireless module is a Bluetooth module.

41. The communication device of claim 24 wherein said at least one speaker is operable to broadcast sound at a greater volume than that achieved by said cellular telephone.

42. The communication device of claim 24 further comprising an external output jack connectable to an external speaker.

43. The communication device of claim 24 wherein said communication device is in removable operative connection with an external speaker.

44. The communication device of claim 24 wherein said communication device is operable to receive telephone calls via the cellular telephone.

45. The communication device of claim 24 wherein said communication device is operable to place telephone calls via the cellular telephone.

46. The communication device of claim 24 wherein said interface comprises at least one switch.

47. The communication device of claim 24 wherein said interface is operatively associated with said radio transceiver when said selective device operatively selects communication via the radio transceiver's wireless spectrum and wherein said interface comprises controls for at least one function of said radio transceiver.

48. The communication device of claim 24 wherein said interface is operatively associated with said at least one cellular telephone when said selective device operatively selects communication via said cellular telephone and wherein said interface comprises controls for at least one function of said cellular telephone.

49. The communication device of claim 24 wherein said at least one speaker further comprises at least one wireless-mode speaker operatively associated with said wireless module and at least one radio transceiver-mode speaker operatively associated with said radio transceiver.

50. The communication device of claim 49 wherein said selective device operatively selects communication via said cellular telephone by decreasing the output of said at least one radio transceiver-mode speaker.

51. The communication device of claim 49 wherein said selective device operatively selects communication via said cellular telephone by increasing the output of said at least one wireless-mode speaker.

52. The communication device of claim 49 wherein said selective device operatively selects communication via the radio transceiver's wireless spectrum by increasing the output of said at least one radio transceiver-mode speaker.

53. The communication device of claim 49 wherein said selective device operatively selects communication via the radio transceiver's wireless spectrum by decreasing the output of said at least one wireless-mode speaker.

54. The communication device of claim 24 wherein said selective device is an output switch operatively associated with said at least one speaker.

55. The communication device of claim 24 further comprising at least one external device.

56. The communication device of claim 55 wherein said wireless module is operable to communicate with said at least one external device, wherein said communication device can send and receive communications and/or data from said at least one external device and send and receive said communications and/or data to said at least one cellular telephone.

57. The communication device of claim 24 wherein said wireless module is operable to wirelessly communicate with at least one voice activated device.

58. The communication device of claim 24 further comprising an external microphone jack.

59. A communication device having wireless cellular telephone connectivity comprising:
a vehicle mounted transceiver unit; and
a handset in operable association with said vehicle mounted transceiver unit, wherein said handset comprises at least one microphone, and an interface;
wherein said vehicle mounted transceiver unit comprises:
a radio transceiver having a wireless spectrum,
a wireless module operable to receive and transmit wireless communications with at least one cellular telephone;
at least one speaker; and
a selective device in operative association with said wireless module and said radio transceiver, and operable to select between at least communication via the radio transceiver's wireless spectrum and communication via said cellular telephone.

60. The communication device of claim 59 wherein said radio transceiver operates on the citizens band radio frequencies.

61. The communication device of claim 59 wherein said radio transceiver operates on the business band radio frequencies.

62. The communication device of claim 59 wherein said wireless module is a wireless module selected from the group consisting of a Bluetooth module, a ZigBee module, an in infra red module, a module adhering to the 802.11 standard of the Institute of Electrical and Electronics Engineers, a Wi-Fi module, and a WiFimax module.

63. The communication device of claim 59 wherein said vehicle mounted transceiver unit further comprises an indicator operable to indicate the active mode of communication.

64. The communication device of claim 59 wherein the operable association between said vehicle mounted transceiver unit and said handset comprises a cord.

65. The communication device of claim 59 wherein the operable association between said vehicle mounted transceiver unit and said handset comprises a wireless connection.

66. The communication device of claim 59 wherein said vehicle mounted transceiver unit further comprises an amplifier in operative association with said speaker.

67. The communication device of claim 59 wherein said handset comprises separate microphones for communication via the citizen band wireless spectrum and communication via said cellular telephone.

68. The communication device of claim 59 wherein communication via said cellular telephone may be made in half-duplex mode.

69. The communication device of claim 59 wherein said cellular telephone is a smart phone.

70. The communication device of claim 59 wherein said cellular telephone is connected to the cellular telephone wireless network.

71. The communication device of claim 59 wherein the cellular telephone is connected to a satellite network.

72. The communication device of claim 59 further comprising at least one electronic noise canceling circuit.

73. The communication device of claim 59 further comprising an acoustic noise canceling design.

74. The communication device of claim 59 wherein said speaker is operable to broadcast sound at a greater volume than that achieved by said cellular telephone.

75. The communication device of claim 59 wherein said communication device will selectively pair with one of said at least one cellular telephone based on priority.

76. The communication device of claim 59 further comprising an external output jack connectable to an external speaker.

77. The communication device of claim 59 wherein said communication device is in removable operative connection with an external speaker.

78. The communication device of claim 59 wherein said interface comprises at least one switch.

79. The communication device of claim 59 wherein said interface is operatively associated with said radio transceiver when said selective device operatively selects communication via the radio transceiver's wireless spectrum and wherein said interface comprises controls for at least one function of said radio transceiver.

80. The communication device of claim 59 wherein said interface is operatively associated with said at least one cellular telephone when said selective device operatively selects communication via said cellular telephone and wherein said interface comprises controls for at least one function of said cellular telephone.

81. The communication device of claim 59 wherein said at least one speaker further comprises at least one wireless-mode speaker operatively associated with said wireless module and at least one radio transceiver-mode speaker operatively associated with said radio transceiver.

82. The communication device of claim 81 wherein said selective device operatively selects communication via said cellular telephone by decreasing the output of said at least one radio transceiver-mode speaker.

83. The communication device of claim 81 wherein said selective device operatively selects communication via said cellular telephone by increasing the output of said at least one wireless-mode speaker.

84. The communication device of claim 81 wherein said selective device operatively selects communication via the radio transceiver's wireless spectrum by increasing the output of said at least one radio transceiver-mode speaker.

85. The communication device of claim 81 wherein said selective device operatively selects communication via the radio transceiver's wireless spectrum by decreasing the output of said at least one wireless-mode speaker.

86. The communication device of claim 59 wherein said selective device is an output switch operatively associated with said at least one speaker.

87. The communication device of claim 59 wherein said communication device is operable to receive telephone calls via the cellular telephone.

88. The communication device of claim 59 wherein said communication device is operable to make telephone calls via the cellular telephone.

89. The communication device of claim 59 further comprising at least one external device.

90. The communication device of claim 89 wherein said wireless module is operable to communicate with said at least one external device, wherein said communication device can send and receive communications and/or data from said at least one external device and send and receive said communications and/or data to said at least one cellular telephone.

91. The communication device of claim 59 wherein said wireless module is operable to wirelessly communicate with at least one voice activated wireless device.

92. The communication device of claim 59 further comprising an external microphone jack.

93. A communication device having wireless connectivity comprising:
 a vehicle mounted transceiver unit;
 a handset in operable association with said vehicle mounted transceiver unit, wherein said handset comprises at least one microphone, and an interface; and
 a wireless module operable to receive and transmit wireless communications with at least one external device, wherein said wireless module is in operable association with said vehicle mounted transceiver unit and said handset;
 wherein said vehicle mounted transceiver unit comprises:
 a radio transceiver having a wireless spectrum,
 at least one speaker; and
 a selective device in operative association with said wireless module and said radio transceiver, and operable to select between at least communication via the radio transceiver's wireless spectrum and communication via said external device.

94. The communication device of claim 93 further comprising at least one electronic noise canceling circuit.

95. The communication device of claim 93 further comprising an acoustic noise canceling design.

96. The communication device of claim 93 wherein said speaker is operable to broadcast sound at a greater volume than that achieved by said cellular telephone.

97. The communication device of claim 93 wherein said interface comprises at least one switch.

98. The communication device of claim 93 wherein said at least one external device further comprises at least one cellular telephone.

99. The communication device of claim 93 wherein said wireless module is operable to wirelessly communicate with at least one voice activated wireless device.

100. The communication device of claim 93 further comprising an external microphone jack.

101. The communication device of claim 93 wherein said selective device is an output switch operatively associated with said at least one speaker.

\* \* \* \* \*